United States Patent
O'Connor et al.

(10) Patent No.: US 7,412,579 B2
(45) Date of Patent: Aug. 12, 2008

(54) SECURE MEMORY CONTROLLER

(76) Inventors: Dennis M. O'Connor, 12130 E. Via De Palmas, Chandler, AZ (US) 85249; Mark N. Fullerton, 6636 W. William Cannon Dr. #218, Austin, TX (US) 78735; Ray Richardson, 3582 W. Linda Ln., Chandler, AZ (US) 85226

( * ) Notice: Subject to any disclaimer, the term of this patent is extended or adjusted under 35 U.S.C. 154(b) by 288 days.

(21) Appl. No.: 11/027,784

(22) Filed: Dec. 30, 2004

(65) Prior Publication Data

US 2006/0149917 A1    Jul. 6, 2006

(51) Int. Cl.
    *G06F 12/00*    (2006.01)
(52) U.S. Cl. .................... 711/163; 711/173; 710/107
(58) Field of Classification Search ................ 711/173
    See application file for complete search history.

(56) References Cited

U.S. PATENT DOCUMENTS

| | | | |
|---|---|---|---|
| 6,336,187 B1 | 1/2002 | Kern et al. | |
| 6,651,171 B1* | 11/2003 | England et al. | 713/193 |
| 6,678,755 B1 | 1/2004 | Peterson et al. | |
| 6,934,817 B2* | 8/2005 | Ellison et al. | 711/153 |
| 7,177,972 B2 | 2/2007 | Watanabe | |
| 2003/0172214 A1* | 9/2003 | Moyer et al. | 710/200 |
| 2003/0200451 A1* | 10/2003 | Evans et al. | 713/193 |
| 2004/0044906 A1* | 3/2004 | England et al. | 713/200 |
| 2004/0088513 A1* | 5/2004 | Biessener et al. | 711/173 |
| 2004/0243823 A1* | 12/2004 | Moyer et al. | 713/200 |
| 2005/0114616 A1* | 5/2005 | Tune et al. | 711/163 |

\* cited by examiner

*Primary Examiner*—Matt Kim
*Assistant Examiner*—Ryan Dare

(57) ABSTRACT

A memory controller partitions memory into secure partitions and non-secure partitions.

8 Claims, 5 Drawing Sheets

SECURE MEMORY CONTROLLER

FIELD

The present invention relates generally to integrated circuits, and more specifically to integrated circuits that include memory controllers.

BACKGROUND

A microprocessor may include the ability to run in various modes. For example, some processor cores licensable from ARM Holdings plc, Cambridge, UK, can run in a user mode as well as a privileged mode. Privileged mode is typically used by operating system (OS) processes, and user mode is typically used by application processes.

Processors may also include the ability to run processes in a secure mode or non-secure mode, and may be able to access secure resources and non-secure resources. For example, secure processes may be able to access secure resources, and non-secure processes may be able to access non-secure resources.

DESCRIPTION OF EMBODIMENTS

Figure 1:
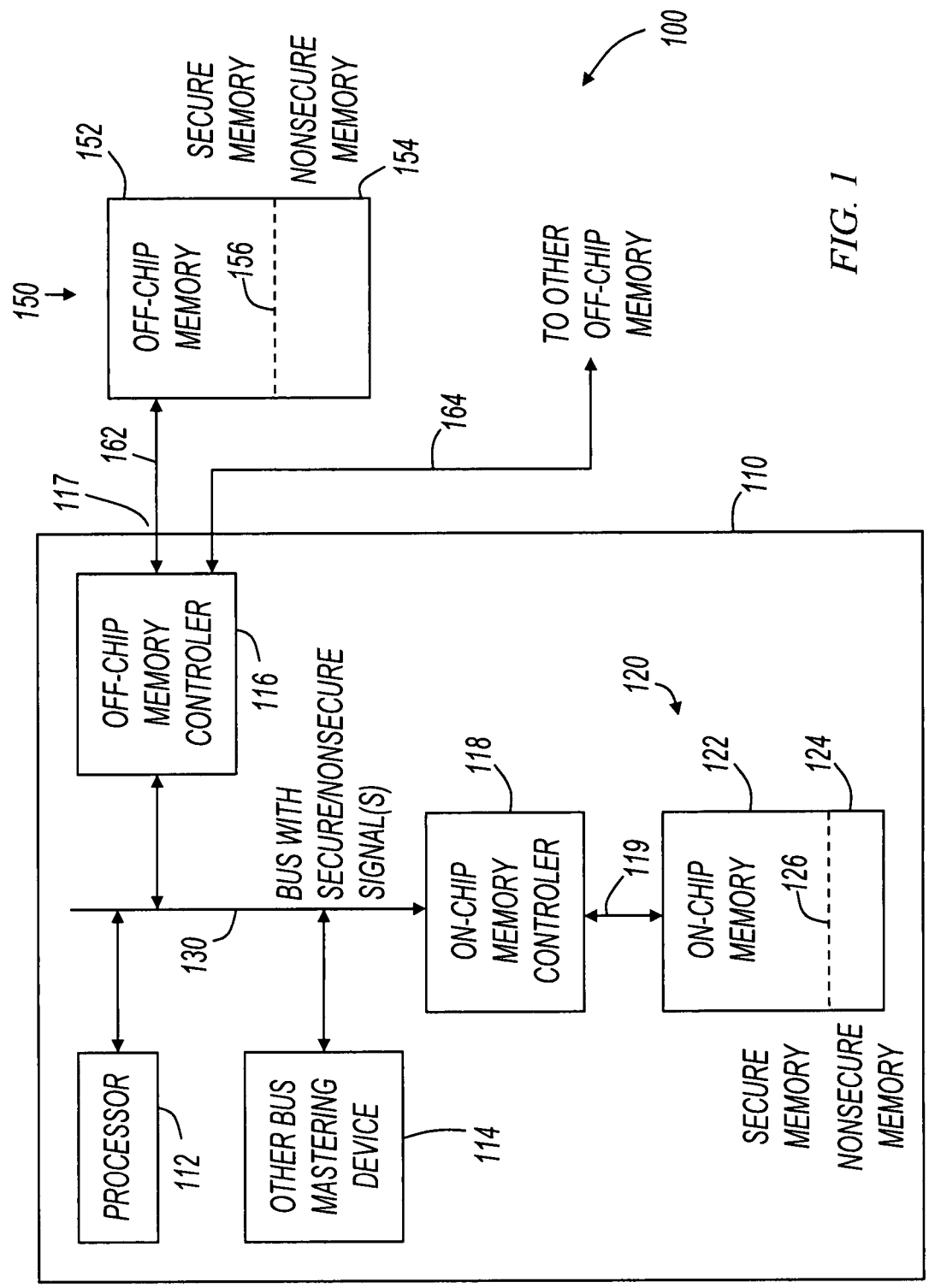
FIG. 1 shows a block diagram of an electronic system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a block diagram of an electronic system. System 100 includes system-on-chip (SOC) 110 and off-chip memory 150. In some embodiments, SOC 110 is an integrated circuit that includes many components. As shown in FIG. 1, SOC 110 includes processor 112, bus mastering device 114, memory controllers 116 and 118, and on-chip memory 120. As used herein, the term "system-on-chip" and the acronym "SOC" do not imply any particular level of integration. For example, in some embodiments, an SOC may include only a processor and a memory controller, or a bus mastering device and a memory controller. Also for example, in some embodiments, an SOC may include all of the components shown in FIG. 1 in addition to others.

Processor 112 and bus mastering device 114 are examples of bus mastering devices. For example, processor 112 may take control of bus 130 when communicating with other components within SOC 110. Also for example, other bus mastering device 114 may be a direct memory access (DMA) controller that may take control of bus 130 to communicate with other components within SOC 110. Any number of processors and bus mastering devices may be included in SOC 110 without departing from the scope of the present invention.

Processor 112 is any processor that may run in a secure mode or a non-secure mode. For example, processor 112 may be a processor core capable of running in a privileged mode and a user mode, or any number of modes with varying security levels. Likewise, bus mastering device 114 may be any other type of device that may run in a secure mode, a non-secure mode, or modes with varying security levels. Further, in some embodiments, bus mastering device 114 may be a bus mastering device that is limited to running in only a secure mode or only a non-secure mode.

Processor 112 and bus mastering device 114 communicate with memory controllers 116 and 118 over bus 130. In some embodiments, bus 130 includes one or more signal paths that carry information to identify the security mode in which the bus master is operating. For example, processor 112 may assert a single bit on bus 130 to signify whether processor 112 is operating in secure mode or non-secure mode. In other embodiments, processor 112 may assert a plurality of bits on bus 130 to indicate the security level at which processor 112 is operating. In these various embodiments, bus 130 may include a varying number of signal paths to accommodate the bits that signify the secure mode or security level.

Memory controllers 116 and 118 communicate with off-chip memory 150 and on-chip memory 120, respectively. Off-chip memory controller 116 provides an interface between a bus master in SOC 110 and off-chip memory 150, and on-chip memory controller 118 provides an interface between a bus master in SOC 110 and on-chip memory 120. For example, memory control signal lines 162 are coupled between memory controller 116 and memory 150, and memory control signal lines 119 are coupled between memory controller 118 and memory 120.

Memory controllers 116 and 118 receive information from, and provide information to, bus masters on bus 130. For example, a bus master may request that a memory controller perform one or more memory transactions. In addition, a bus master may provide information describing the security mode or security level of the process requesting a memory transaction. For example, processor 112 may be running in a secure mode, and may request on-chip memory controller 118 to perform a memory read or memory write in on chip memory 120.

As used herein, the term "secure transaction" refers to a transaction within SOC 110 in which one or more signals on bus 130 signifies that a bus master is operating in a secure mode. For example, when running a secure process, processor 112 may request a memory transaction through memory controller 116 or memory controller 118. If one or more secure/non-secure signals are asserted on bus 130, the transaction is referred to as a "secure transaction."

In some embodiments, memory controllers 116 and 118 partition memory into secure partitions and non-secure partitions. For example, on chip memory controller 118 may partition on-chip memory 120 into secure memory partition 122 and non-secure memory partition 124, where the partitions are shown separated at boundary 126. Also for example, off-chip memory controller 116 may partition off-chip memory 120 into secure memory partition 152 and non-secure memory partition 154 where the partitions are shown separated at boundary 156.

The memory controllers may utilize various different apparatus to allow the specification of secure partitions and non-secure partitions. For example, in some embodiments of the present invention, each memory controller may maintain a range register and a direction bit. The range register may be programmed with a value that specifies a point in the memory that divides the secure partition from the non-secure partition. For example, memory controller 118 may have a range register programmed with a value corresponding to the boundary shown at 126, and memory controller 116 may have a range register programmed with a value corresponding to the boundary shown at 156. The direction bit may be programmed to specify which side of the boundary is secure memory, and which side is non-secure memory. Example embodiments of memory controllers using range registers and direction bits are described in more detail below.

Off-chip memory controller 116 may control any number of memories. For example, as shown in FIG. 1, memory controller 116 provides memory control signal lines 162 to memory 120, and memory control signal lines 164 to other memories (not shown). Within SOC 110, memory control signal lines are provided between off-chip memory controller 116 and a chip boundary at 117.

Memory 120 and 150 may be of any type. For example, in some embodiments, the memories may be one or more of dynamic random access memory (DRAM), static random access memory (SRAM), Flash memory, or any other suitable memory type. Also for example, memory 120 or memory 150 may be execute-in-place (XIP) Flash memory that holds program instructions to be fetched directly from the Flash memory.

Figure 2:
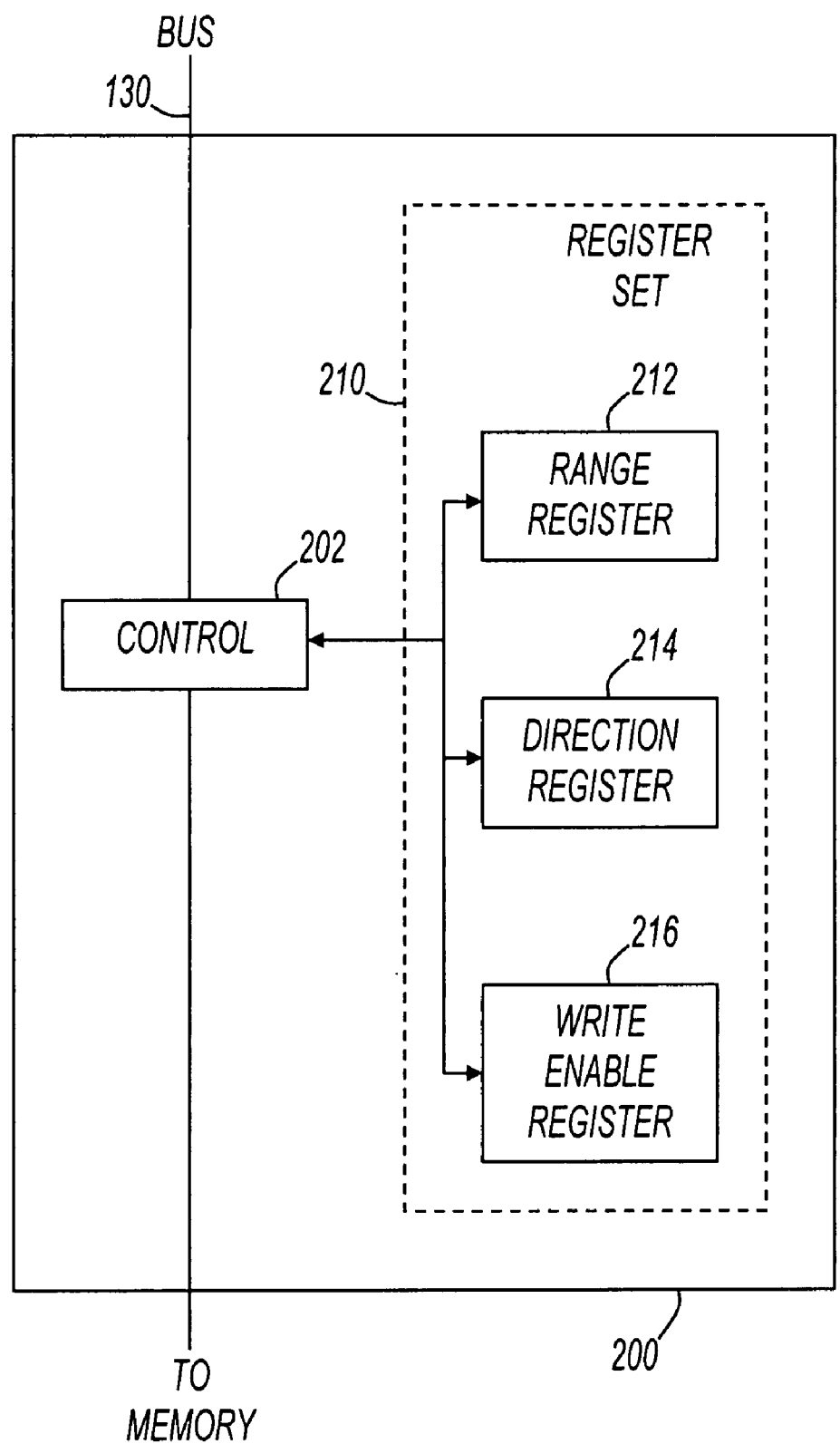
FIGS. 2 and 3 show block diagrams of memory controllers.

FIG. 2 shows a block diagram of a memory controller. In some embodiments, memory controller 200 may be utilized as a standalone memory controller, and in other embodiments, memory controller 200 may be a memory controller in a system on a chip. For example, memory controller 200 may be utilized as on-chip memory controller 118, or off-chip memory controller 116 (FIG. 1). Memory controller 200 includes control block 202 and register set 210. Register set 210 includes range register 212, direction register 214, and write enable register 216.

In some embodiments, register set 210 and control block 202 represent a memory partitioning mechanism that may be used to logically partition a memory into secure and non-secure partitions. For example, range register 212 may be used to hold the value of a boundary between secure and non-secure partitions such as the boundary at 126 in memory 120 or the boundary at 156 in memory 150. Also for example, direction register 214 may include a direction bit that signifies which direction the secure partition lies from the boundary, or which direction the non-secure partition lies from the boundary. In some embodiments, direction register 214 may include one direction bit, and in other embodiments, direction register 214 may include a plurality of bits. For example, in some embodiments, a direction bit may be included in a register that also includes other bits, such as control or status bits.

Figure 4:
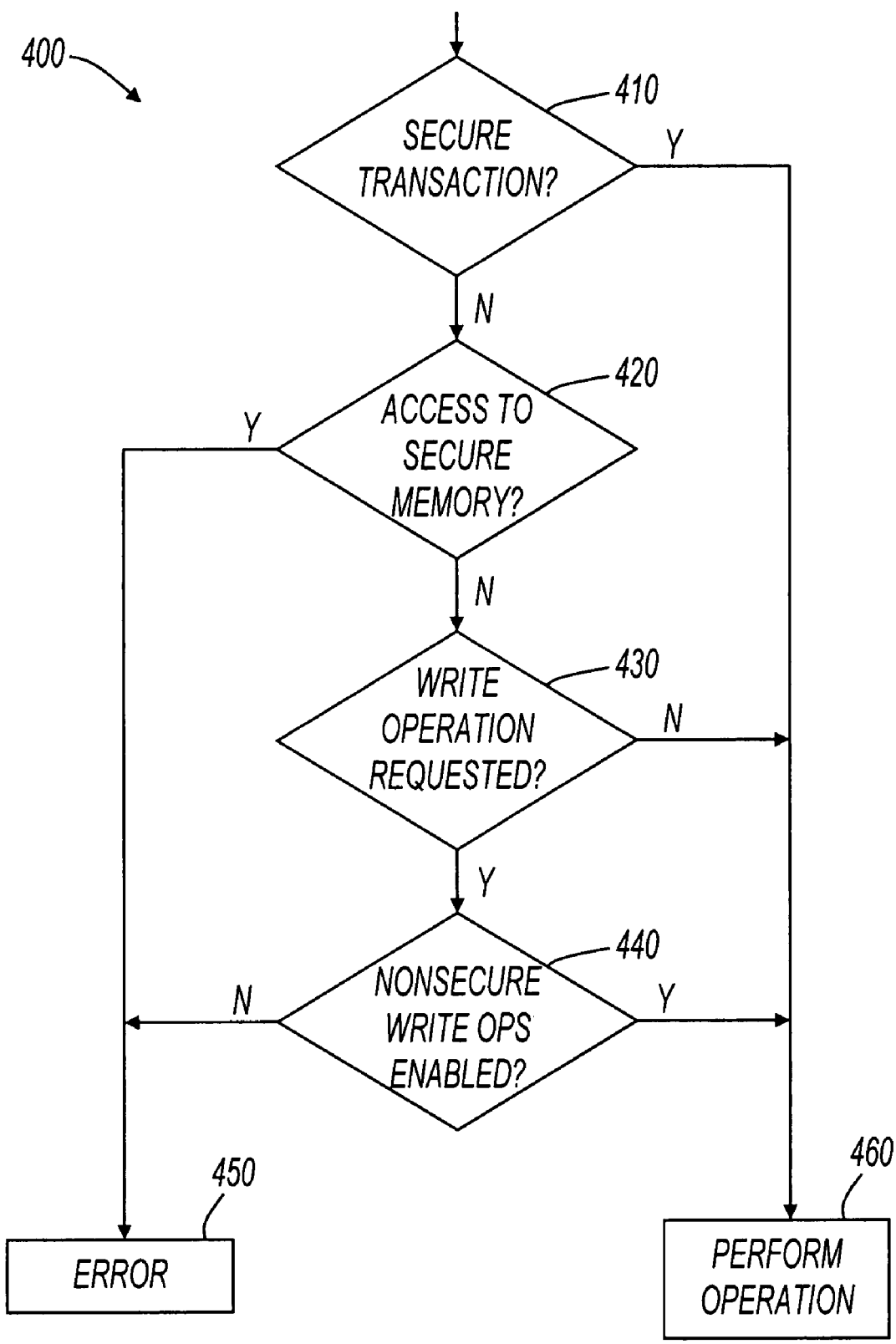
FIG. 4 shows a flowchart in accordance with various embodiments of the present invention.

Write enable register 216 may be utilized to determine whether a particular memory partition may be written to by a non-secure process. For example, when memory controller 200 is performing a non-secure memory transaction that includes a write operation, control block 202 may consult the contents of write enable register 216 to determine if a non-secure write operation may write to a non-secure partition. More examples of this functionality are described below with reference to method 400 (FIG. 4).

Control block 202 may be any type of control circuit capable of performing operations within memory controller 200. For example, control block 202 may include a state machine, a microcontroller, or the like. In operation, control block 202 receives requests for memory transactions on bus 130. Further, control block 202 receives a secure/non-secure indication on bus 130 to indicate whether a secure process is requesting the memory transaction (a "secure transaction") or a non-secure process is requesting the memory transaction (a "non-secure transaction"). In response to the memory transaction request and the status of the secure/non-secure signal (s) on bus 130, control block 202 either performs the transaction or refuses the transaction and reports an error back to the bus master on bus 130. For example, if a bus master running a secure process requests a memory transaction, control block 202 may perform the transaction regardless of the state of register set 210. Also for example, if a bus master running a non-secure process requests a memory transaction, control block 202 may conditionally perform the transaction based on the state of register set 210.

In some embodiments, register set 210 includes additional configuration bits. For example, additional configuration bits might be instantiated to control whether an error is signaled, and how it is signaled. Additional status registers may also exit to capture details (such as the address) of an aborted transaction to aid in determining the source of the error. In some embodiments, all of the resources within register set 210 are secure resources that can only be written by a secure transaction.

Figure 3:
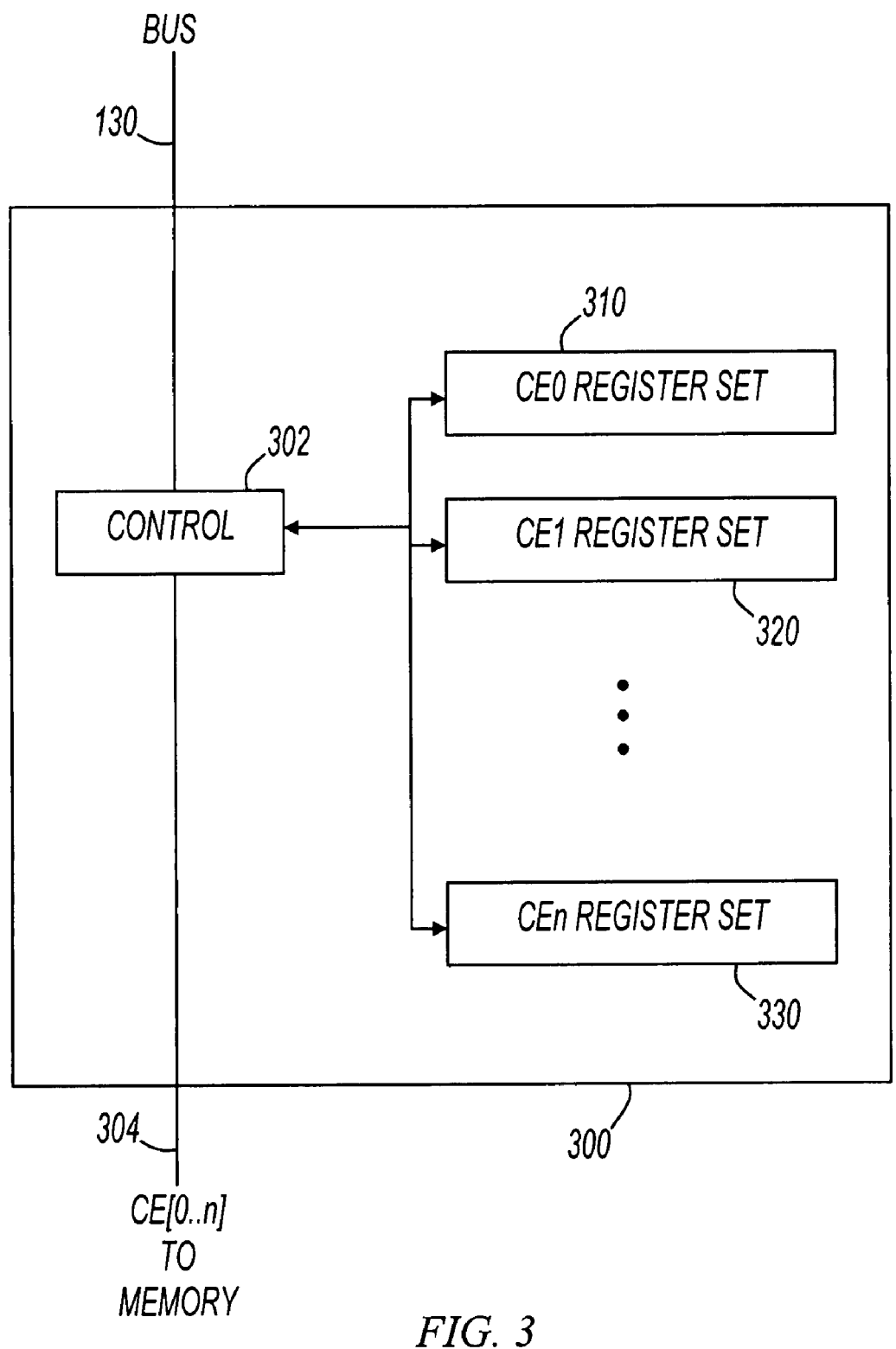

FIG. 3 shows a block diagram of a memory controller. In some embodiments, memory controller 300 may be utilized as a standalone memory controller, and in other embodiments, memory controller 300 may be a memory controller in a system on a chip. For example, memory controller 300 may be utilized as on-chip memory controller 118, or off-chip memory controller 116 (FIG. 1). Memory controller 300 includes control block 302 and register sets 310, 320, and 330.

In some embodiments, each of register sets 310, 320, and 330 includes a range register, a direction register, and a write enable register, or equivalent structures. In some embodiments, the operation of each of the register sets 310, 320, and 330 corresponds to register set 210 (FIG. 2). Further, each of register sets 310, 320, and 330 may represent an independent memory partitioning mechanism. FIG. 3 shows n+1 register sets, where n is any integer, and control block 302 provides n+1 chip enable (CE) signals to memories.

In operation, each register set may be used to logically partition a memory, and each signal in CE[0 . . . n] may be used to either allow a memory operation or disallow a memory operation. Although chip select signals are shown in FIG. 3, this is not a limitation of the present invention. For example, other types of signals may be used to allow or disallow memory operations in memories.

In some embodiments, memory controller 300 may be used to control multiple external memories. For example, memory controller 300 may be used as memory controller 116, and signal lines 304 may correspond to signal lines 162 and 164 (FIG. 1). In other embodiments, memory controller 300 may be used to control an internal memory. For example, memory controller 300 may be used as on-chip memory controller 118, and signal lines 304 may correspond to signal lines 119 (FIG. 1). In these embodiments, memory 120 (FIG. 1) may include multiple physically separate memory blocks, or may include one large physical memory block that may be divided into multiple secure partitions and multiple non-secure partitions.

In some embodiments, memory controller 300 may be utilized to partition a memory into partitions with varying levels of security. For example, registers within register sets 310, 320, and 330 may be utilized to define a range of locations within a memory for each security level. In these embodiments, bus 130 may includes signal lines that express the level of security of the current memory transaction, (the "memory transaction security level"), and control block 302 may be responsive to those signal lines. For example, control block 302 may include circuitry to allow access to a partition when the memory transaction security level is appropriate for that partition. Further, control block 302 may include circuitry to block access to a partition when the memory transaction security level is inappropriate for that partition. In some embodiments, a memory transaction security level may be appropriate when it matches the security level of the partition, and in other embodiments, a memory transaction security level may be appropriate when it has a value relative to the security level of the partition. For example, the memory transaction security level may be appropriate for a partition when it is equal to or greater than the security level of the partition, or if it is greater than the security level of the partition.

Memory controllers, processors, memories, systems-on-chip, registers, and other embodiments of the present invention can be implemented in many ways. In some embodiments, they are implemented in integrated circuits. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, custom devices, or the like. Likewise, any embodiment of the present invention can also be represented as a hard macro targeted to a specific manufacturing process. For example, memory controller 118 (FIG. 1) may be represented as polygons assigned to layers of an integrated circuit.

FIG. 4 shows a flowchart in accordance with various embodiments of the present invention. In some embodiments, method 400, or portions thereof, is performed by a memory controller or a control block within a memory controller, embodiments of which are shown in the various figures. In other embodiments, method 400 is performed by a control circuit, an integrated circuit, a system on a chip, or an electronic system. Method 400 is not limited by the particular type of apparatus or software element performing the method. The various actions in method 400 may be performed in the order presented, or may be performed in a different order. Further, in some embodiments, some actions listed in FIG. 4 are omitted from method 400.

Method 400 is shown beginning with block 410. At 410, method 400 determines if the current memory transaction is a secure transaction. For example, a control block in a memory controller may determine whether a transaction is secure or non-secure based on the value of secure/non-secure signal(s) on a bus. If the transaction is secure, the operation is performed at 460. For example, if the transaction includes a read operation or a write operation in either secure or non-secure memory, then the operation will be performed as long as the transaction is secure.

If the transaction is not secure, then at 420, method 400 determines whether the memory transaction is attempting to access secure memory. In some embodiments, this may be accomplished by comparing a target address of the memory transaction with a value in a range register, such as range register 212 (FIG. 2). If the non-secure memory transaction is attempting to access secure memory, then an error condition occurs at 450. The error condition at 450 may cause the transaction to be ignored, or may raise an exception to a processor, or may perform some other error reporting or processing function. If the non-secure transaction is not attempting to access secure memory, then method 400 proceeds to 430.

At 430, method 400 determines whether a write operation is requested as part of the memory transaction. If a write operation is not requested, then the operation is performed at 460. If a write operation is requested, then at 440, method 400 determines if write operations are enabled for non-secure transactions. In some embodiments, this may correspond to a memory controller checking the contents of a write enable register such as write enable register 216 (FIG. 2). If non-secure write operations are enabled, then the operation is performed at 460, and if write operations are disabled, then an error condition occurs at 450.

Figure 5:
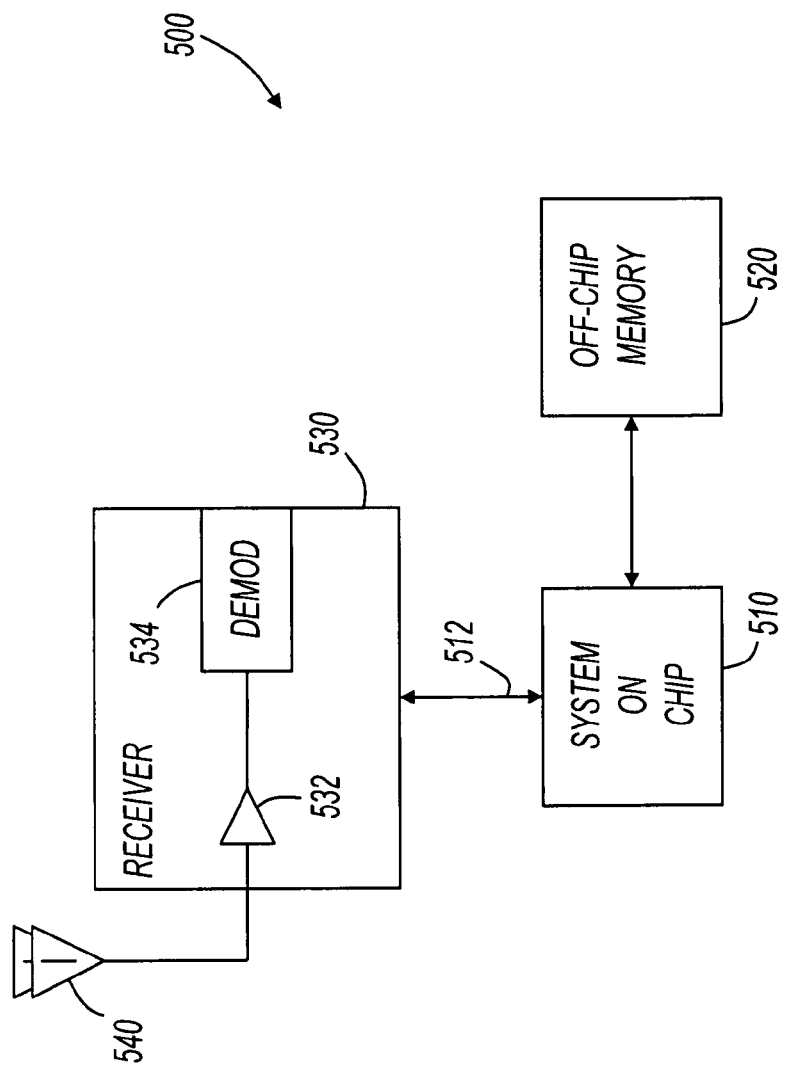
FIG. 5 shows a system diagram in accordance with various embodiments of the present invention.

FIG. 5 shows a system diagram in accordance with various embodiments of the present invention. FIG. 5 shows system 500 including system-on-chip (SOC) 510, off-chip memory 520, receiver 530, and antennas 540. SOC 510 may include one or more memory controllers capable of partitioning memory into secure and non-secure partitions as described with reference to the various embodiments of the invention.

In systems represented by FIG. 5, SOC 510 is coupled to receiver 530 by conductor 512. Receiver 530 receives communications signals from antennas 540 and also communicates with SOC 510 on conductor 512. In some embodiments, receiver 530 provides communications data to SOC 510. Also in some embodiments, SOC 510 provides control information to receiver 530 on conductor 512.

Example systems represented by FIG. 5 include cellular phones, personal digital assistants, wireless local area network interfaces, and the like. Many other systems uses for SOC 510 exist. For example, SOC 510 may be used in a desktop computer, a network bridge or router, or any other system without a receiver.

Receiver 530 includes amplifier 532 and demodulator (demod) 534. In operation, amplifier 532 receives communications signals from antennas 540, and provides amplified signals to demod 534 for demodulation. For ease of illustration, frequency conversion and other signal processing is not shown. Frequency conversion can be performed before or after amplifier 532 without departing from the scope of the present invention. In some embodiments, receiver 530 may be a heterodyne receiver, and in other embodiments, receiver 530 may be a direct conversion receiver. In some embodiments, receiver 530 may include multiple receivers. For example, in embodiments with multiple antennas 540, each antenna may be coupled to a corresponding receiver.

Receiver 530 may be adapted to receive and demodulate signals of various formats and at various frequencies. For example, receiver 530 may be adapted to receive time domain multiple access (TDMA) signals, code domain multiple access (CDMA) signals, global system for mobile communications (GSM) signals, orthogonal frequency division multiplexing (OFDM) signals, multiple-input-multiple-output (MIMO) signals, spatial-division multiple access (SDMA) signals, or any other type of communications signals. The various embodiments of the present invention are not limited in this regard.

Antennas 540 may include one or more antennas. For example, antennas 540 may include a single directional antenna or an omni-directional antenna. As used herein, the term omni-directional antenna refers to any antenna having a substantially uniform pattern in at least one plane. For example, in some embodiments, antennas 540 may include a single omni-directional antenna such as a dipole antenna, or a quarter wave antenna. Also for example, in some embodiments, antennas 540 may include a single directional antenna such as a parabolic dish antenna or a Yagi antenna. In still further embodiments, antennas 540 include multiple physical antennas. For example, in some embodiments, multiple antennas are utilized for multiple-input-multiple-output (MIMO) processing or spatial-division multiple access (SDMA) processing.

Memory 520 may be any type of memory including, but not limited to, volatile memory, nonvolatile memory, RAM, ROM, Flash memory, or any other type of memory. In some embodiments, memory 520 is logically partitioned into secure and non-secure partitions by a memory controller within SOC 510. In other embodiments, memory 520 is partitioned into partitions having varying levels of security.

Although SOC 510 and receiver 530 are shown separate in FIG. 5, in some embodiments, the circuitry of SOC 510 and receiver 530 are combined in a single integrated circuit. Furthermore, receiver 530 can be any type of integrated circuit capable of processing communications signals. For example, receiver 530 can be an analog integrated circuit, a digital signal processor, a mixed-mode integrated circuit, or the like.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An integrated circuit comprising:
a bus master;
memory to hold instructions having varying levels of security to be executed by the bus master when executing at an appropriate security level; and
a memory controller coupled between the bus master and the memory, the memory controller comprising a memory partitioning mechanism to partition the memory into partitions having one of three or more levels of security wherein the memory partitioning mechanism comprises register sets to define a range of locations within the memory for each security level, and wherein the memory partitioning mechanism is coupled to be responsive to a plurality of signal lines provided on a bus by a bus master to indicate a security level in which the bus master is operating, and to allow execution of instructions in a partition only when the bus master is operating at a security level appropriate for the partition.

2. The memory controller of claim 1 wherein the memory partitioning mechanism includes circuitry to allow access to a partition only when the security level in which the bus master is operating matches the security level of the partition.

3. The memory controller of claim 1 wherein the memory partitioning mechanism includes circuitry to allow access to a partition when the security level in which the bus master is operating is equal to or greater then the security level of the partition.

4. An integrated circuit comprising:
a processor;
a non-volatile memory;
a first memory controller including a first mechanism to partition the non-volatile memory into partitions with three or more levels of security, the first mechanism comprising register sets to define a range of locations within the memory for each security level;
a second memory controller including a second mechanism to partition memory external to the integrated circuit into partitions having one of three or more levels of security; and
a bus interconnecting the processor and the first and second memory controllers, the bus including a plurality of signal paths to identify a security status of a memory transaction.

5. The integrated circuit of claim 4 further comprising memory control signal lines coupled between the second memory controller and a boundary of the integrated circuit.

6. The integrated circuit of claim 5 wherein the memory control signal lines comprise a plurality of chip select signal lines.

7. The integrated circuit of claim 6 wherein the second memory controller comprises multiple independent mechanisms to partition a plurality of memories.

8. A system comprising:
an antenna;
a receiver coupled to the antenna; and
an integrated circuit coupled to the receiver, the integrated circuit including a processor, a non-volatile memory, a first memory controller having a first mechanism to partition the non-volatile memory into partitions having one of three or more levels of security, the first mechanism comprising register sets to define a range of locations within the memory for each security level, a second memory controller including a second mechanism to partition memory external to the integrated circuit into partitions with three or more levels of security, and a bus interconnecting the processor and the first and second memory controllers, the bus including a plurality of signal paths to identify a security status of a memory transaction.

* * * * *